US012607403B2

(12) United States Patent
Son et al.

(10) Patent No.: US 12,607,403 B2
(45) Date of Patent: Apr. 21, 2026

(54) AUTOMATIC ELECTRODE DRYING CONTROL SYSTEM AND AUTOMATIC ELECTRODE DRYING CONTROL METHOD

(71) Applicant: LG Energy Solution, Ltd., Seoul (KR)

(72) Inventors: Jin Young Son, Daejeon (KR); Sang Hoon Choy, Daejeon (KR); Shin Wook Jeon, Daejeon (KR); Eun Hoe Jeong, Daejeon (KR); Young Kuk Ko, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 874 days.

(21) Appl. No.: 17/913,006

(22) PCT Filed: Nov. 17, 2021

(86) PCT No.: PCT/KR2021/016858
§ 371 (c)(1),
(2) Date: Sep. 20, 2022

(87) PCT Pub. No.: WO2022/108324
PCT Pub. Date: May 27, 2022

(65) Prior Publication Data
US 2023/0175776 A1      Jun. 8, 2023

(30) Foreign Application Priority Data

Nov. 18, 2020     (KR) ........................ 10-2020-0154295
Nov. 16, 2021     (KR) ........................ 10-2021-0157703

(51) Int. Cl.
F26B 21/35          (2026.01)
F26B 3/28           (2006.01)
(Continued)

(52) U.S. Cl.
CPC .............. F26B 21/35 (2026.01); F26B 3/283 (2013.01); F26B 21/50 (2026.01);
(Continued)

(58) Field of Classification Search
CPC ........ F26B 21/10; F26B 3/285; F26B 21/004; F26B 3/20; H01M 4/0471; H01M 4/0409
(Continued)

(56) References Cited

U.S. PATENT DOCUMENTS 5,540,000 A      7/1996  Rosenburgh et al.
5,950,325 A  *  9/1999  Mehdizadeh ........... F26B 3/343
                                                              34/502
(Continued)

FOREIGN PATENT DOCUMENTS

CN          104374793 A      2/2015
CN          108906536 A      11/2018
(Continued)

OTHER PUBLICATIONS

Extended European Search Report for Application No. 21895092.1 dated Oct. 20, 2023. 8 pgs.
(Continued)

*Primary Examiner* — Stephen M Gravini
(74) *Attorney, Agent, or Firm* — Lerner David LLP

(57) ABSTRACT

A system for automatically controlling an electrode drying includes: an oven which provides a space where an electrode sheet is moved and dried, includes a dryer which applies hot air and/or radiant heat to the electrode sheet, and is divided into a plurality of drying sections; a measuring unit which collects information on a dried amount of the electrode sheet and transmits the collected information to a controller; and the controller which determines a dried level of the electrode sheet based on the information on the dried amount received from the measuring unit, and control a drying intensity of the oven according to the determined dried level. Herein, the controller independently controls the plurality of drying sections.

19 Claims, 6 Drawing Sheets

(51) Int. Cl.

| | |
|---|---|
| *F26B 3/30* | (2006.01) |
| *F26B 21/50* | (2026.01) |
| *H01M 4/04* | (2006.01) |
| *H01M 10/04* | (2006.01) |

(52) U.S. Cl.
CPC ............. *H01M 4/0471* (2013.01); *F26B 3/30* (2013.01); *H01M 10/0409* (2013.01)

(58) Field of Classification Search
USPC .......................................................... 34/443
See application file for complete search history.

(56) References Cited

U.S. PATENT DOCUMENTS

| | | | | |
|---|---|---|---|---|
| 6,649,403 B1 * | 11/2003 | McDevitt | ............. | G01N 21/253 |
| | | | | 436/524 |
| 6,712,937 B1 | 3/2004 | Oechsle et al. | | |
| 6,920,704 B1 * | 7/2005 | Silverbrook | ........... | B41J 15/042 |
| | | | | 34/454 |
| 7,363,729 B2 * | 4/2008 | Tanaka | ...................... | F26B 3/28 |
| | | | | 205/333 |
| 9,126,434 B2 * | 9/2015 | Jessen | ................ | B41J 11/00242 |
| 9,171,714 B2 * | 10/2015 | Mori | ................... | H01L 21/0206 |
| 9,879,908 B2 * | 1/2018 | Triglia, Jr. | .............. | F26B 3/347 |
| 11,313,621 B2 * | 4/2022 | Fredric | ................... | F26B 25/22 |
| 12,085,335 B2 * | 9/2024 | Lin | ............................ | F26B 3/30 |
| 12,209,805 B2 * | 1/2025 | Kim | ...................... | H01M 4/139 |
| 12,228,338 B2 * | 2/2025 | Chun | ...................... | H05B 6/80 |
| 2014/0014037 A1 | 1/2014 | Watanabe et al. | | |

| | | | | |
|---|---|---|---|---|
| 2019/0140253 A1 | 5/2019 | Son et al. | | |
| 2021/0370053 A1 * | 12/2021 | Jin | ....................... | A61N 1/0556 |
| 2023/0175776 A1 * | 6/2023 | Son | ........................ | F26B 3/283 |
| | | | | 34/443 |

FOREIGN PATENT DOCUMENTS

| | | | | | | |
|---|---|---|---|---|---|---|
| CN | 115315826 A | * | 11/2022 | | ......... | H01M 4/0471 |
| EP | 1161595 B1 | | 12/2009 | | | |
| EP | 4109580 A1 | * | 12/2022 | | ......... | H01M 4/0471 |
| JP | 2004267834 A | | 9/2004 | | | |
| JP | 2012209074 A | | 10/2012 | | | |
| JP | 2013137168 A | | 7/2013 | | | |
| JP | 5831223 B2 | | 12/2015 | | | |
| JP | 5984643 B2 | | 9/2016 | | | |
| JP | 2018160663 A | | 10/2018 | | | |
| JP | 2019155214 A | | 9/2019 | | | |
| KR | 101285913 B1 | | 7/2013 | | | |
| KR | 101286003 B1 | | 7/2013 | | | |
| KR | 101477870 B1 | | 12/2014 | | | |
| KR | 20160037672 A | | 4/2016 | | | |
| KR | 101735034 B1 | | 5/2017 | | | |
| KR | 20180080015 A | | 7/2018 | | | |
| KR | 20180125721 A | | 11/2018 | | | |
| KR | 20200082246 A | | 7/2020 | | | |
| WO | WO-0155952 A2 | * | 8/2001 | | .............. | C12Q 1/37 |
| WO | WO-2022108324 A1 | * | 5/2022 | | ......... | H01M 4/0471 |

OTHER PUBLICATIONS

International Search Report for PCT/KR2021/016858 mailed Mar. 2, 2022. 3 pgs.

* cited by examiner

【FIG. 1】
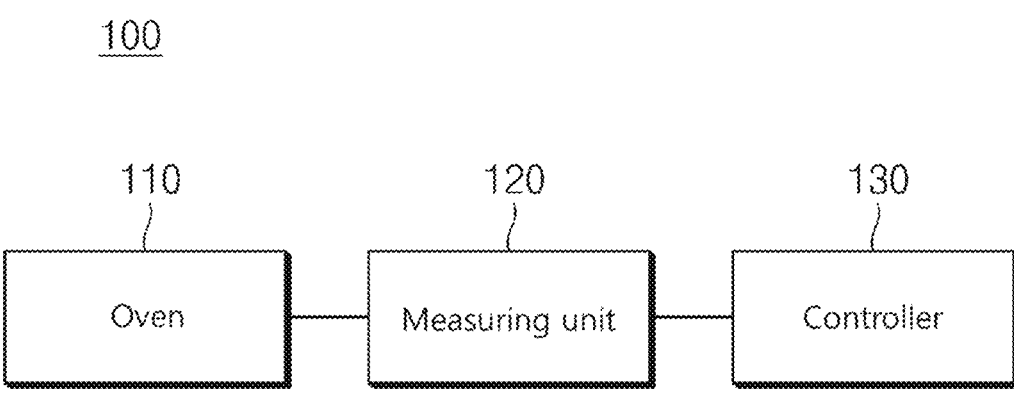

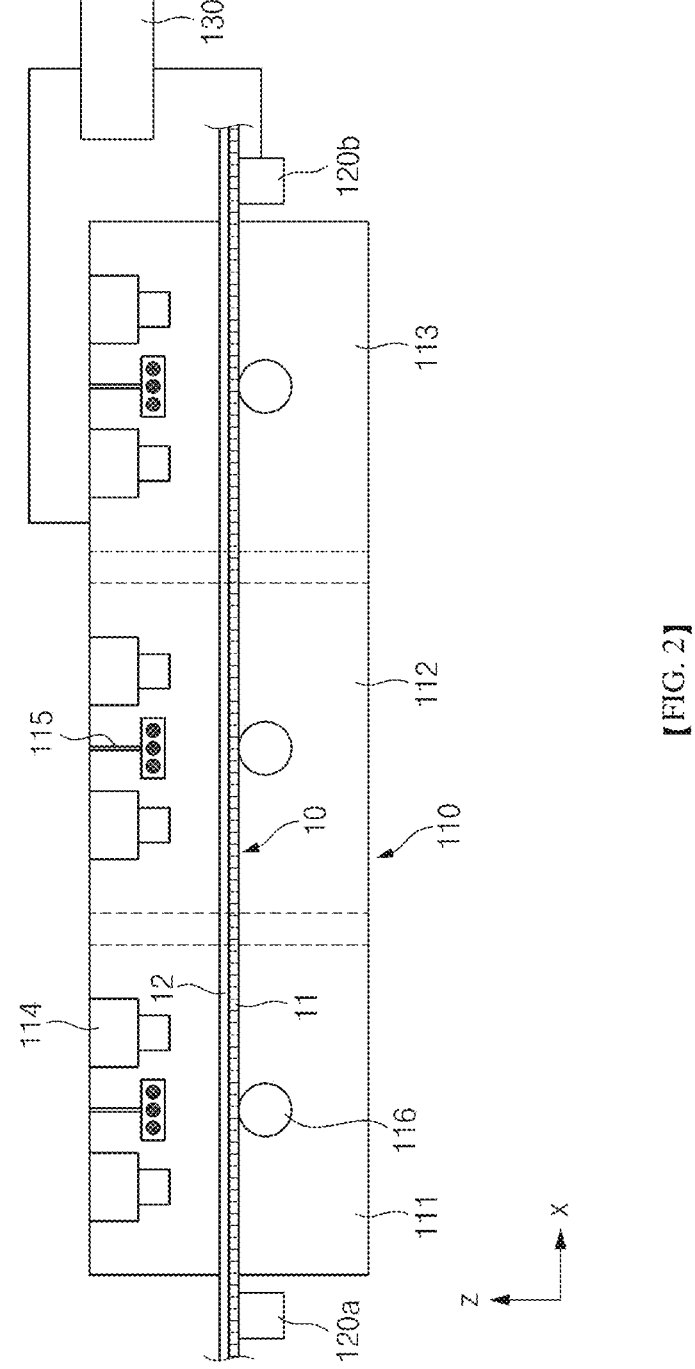
[FIG. 2]

【FIG. 3】
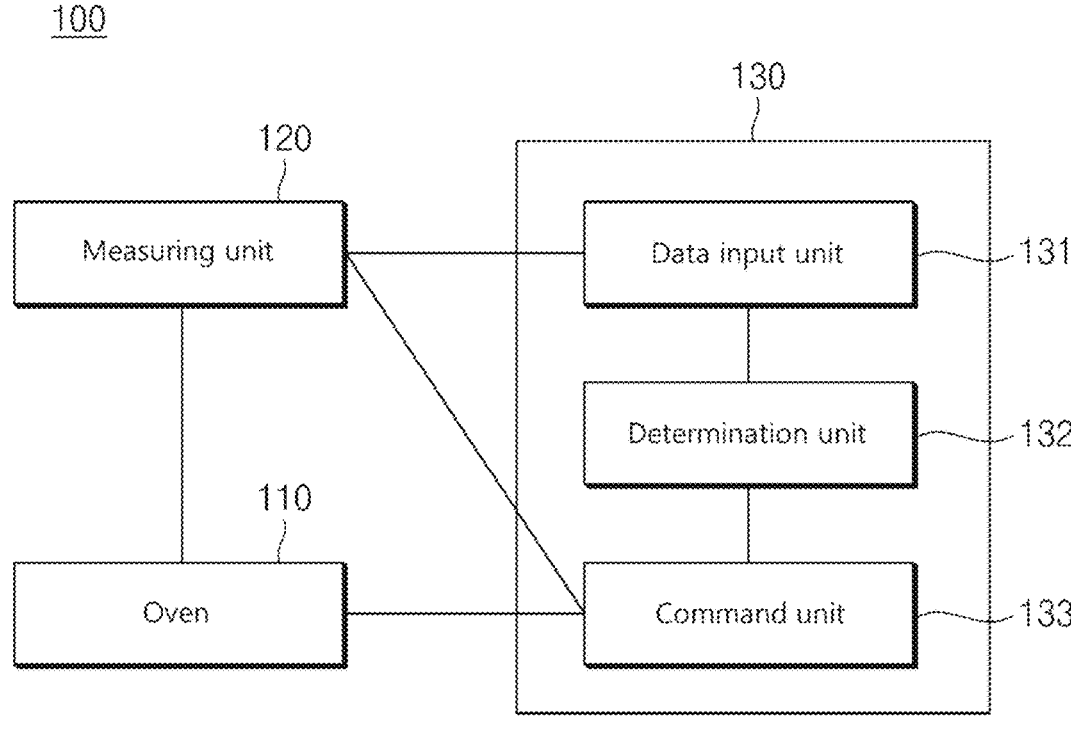

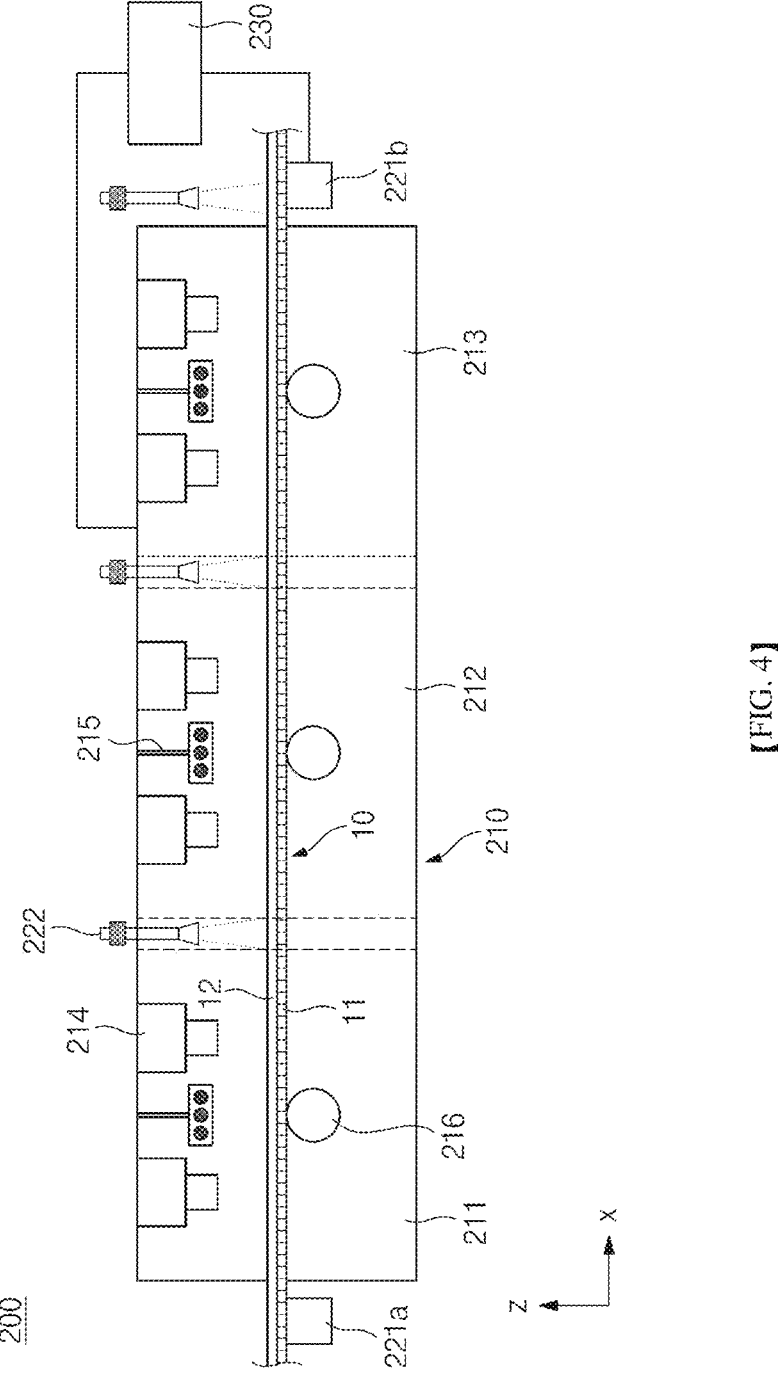
[FIG. 4]

[FIG. 5]
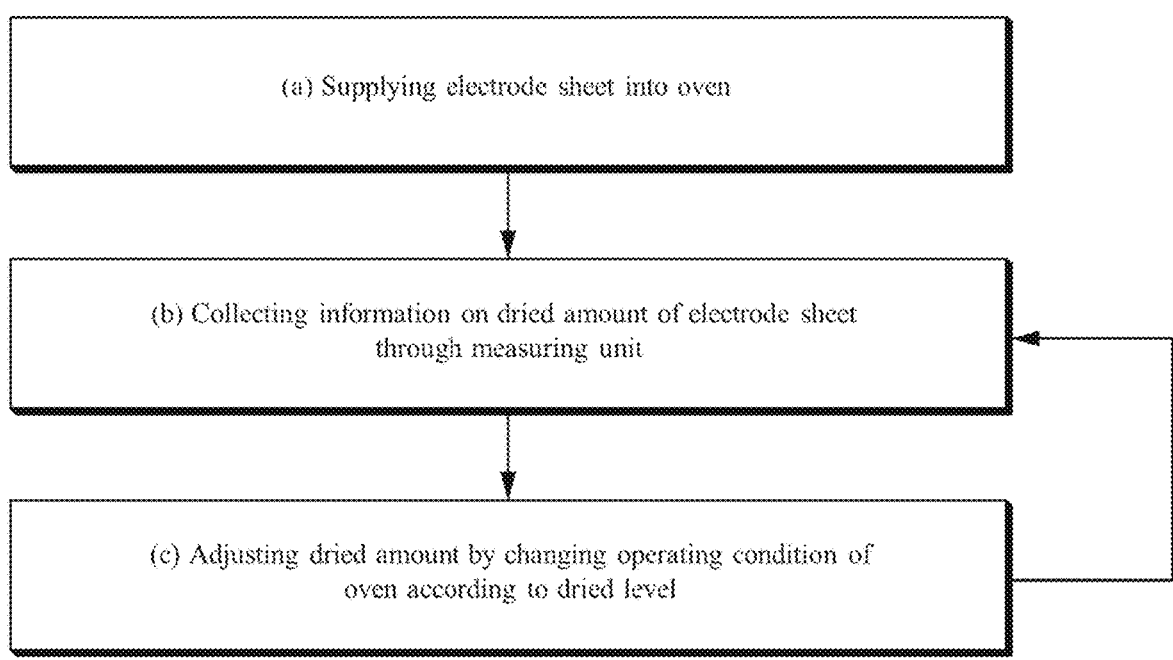

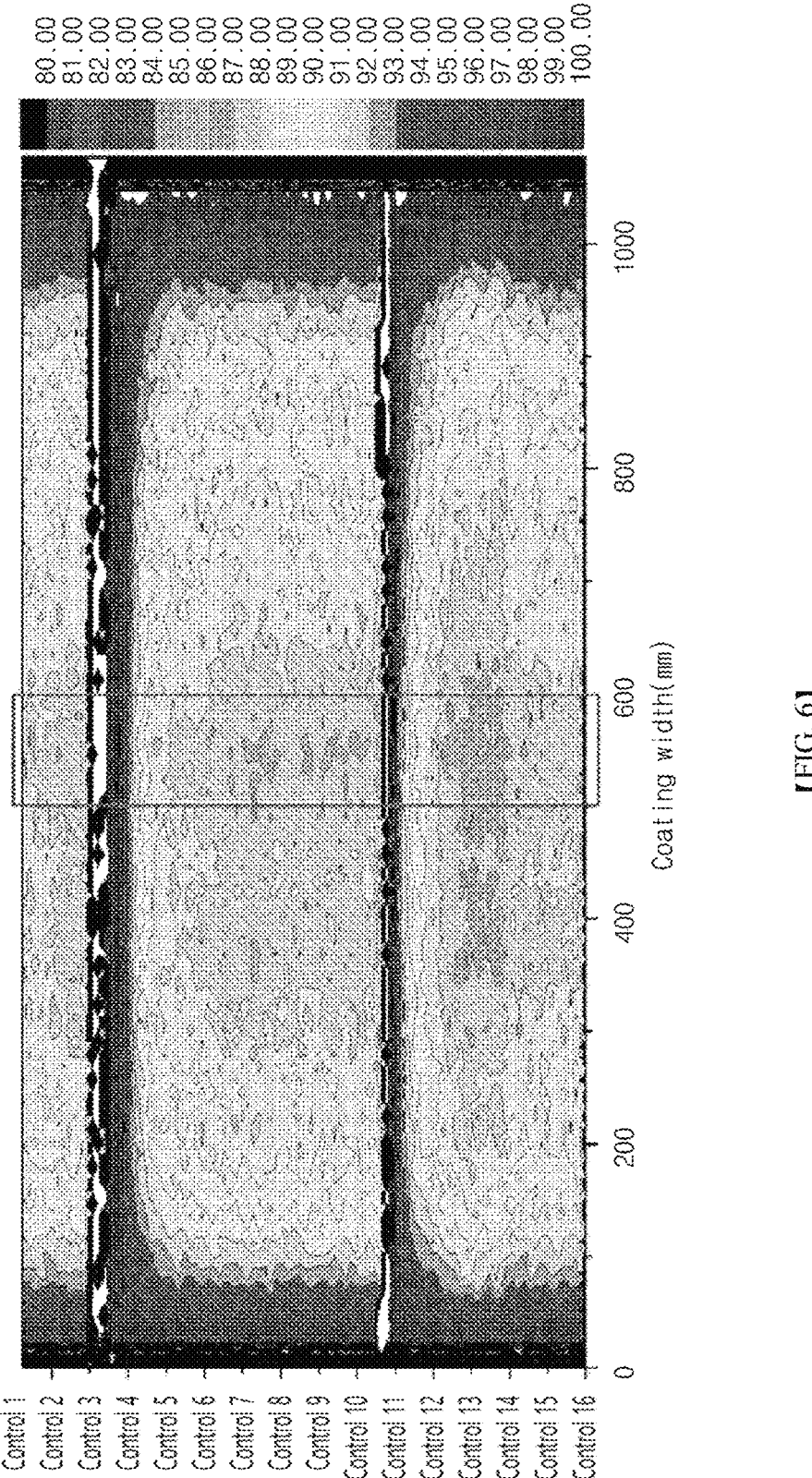
[FIG. 6]

AUTOMATIC ELECTRODE DRYING CONTROL SYSTEM AND AUTOMATIC ELECTRODE DRYING CONTROL METHOD

CROSS REFERENCES TO RELATED APPLICATIONS

This application is a national phase entry under 35 U.S.C. § 371 of International Application No. PCT/KR2021/016858, filed on Nov. 17, 2021, which claims the benefit of priority based on Korean Patent Application No. 10-2020-0154295 filed on Nov. 18, 2020 and Korean Patent Application No. 10-2021-0157703 filed on Nov. 16, 2021, the disclosures of which are incorporated herein by reference.

FIELD OF INVENTION

The present invention relates to a system and method for automatically controlling an electrode drying, and more particularly, to a system and method for automatically controlling an electrode drying, which is capable of recognizing the dried level from information on the dried amount such as the solid content and surface temperature of an electrode sheet, and accordingly adjusting the dried amount of the electrode in real time by automatically operating the dryer.

BACKGROUND

Recently, secondary batteries capable of charging and discharging have been widely used as energy sources of wireless mobile devices. In addition, the secondary battery has attracted attention as an energy source for electric vehicles, hybrid electric vehicles, etc., which are proposed as a solution for air pollution released from existing gasoline vehicles and diesel vehicles using fossil fuel. Therefore, due to such advantages, there are a diversity of applications using the secondary battery, and it is expected that the secondary battery will be applied to many other fields and products in the future.

Such secondary batteries may be classified into lithium-ion batteries, lithium-ion polymer batteries, lithium polymer batteries, etc., depending on the composition of the electrode and the electrolyte. There is an increased demand for lithium-ion polymer batteries which are less likely to leak electrolyte and which are easy to manufacture. In general, secondary batteries are classified into cylindrical batteries, prismatic batteries, and pouch-type batteries. For cylindrical and prismatic batteries, the electrode assembly is embedded in a cylindrical or rectangular metal can, respectively. For pouch-type batteries the electrode assembly is embedded in a pouch-type case of an aluminum laminate sheet.

The electrode assembly built into the battery case is composed of a positive electrode, a negative electrode, and a separator interposed between the positive and negative electrodes. The electrode assembly is a power generating element, capable of charging and discharging. The electrode assembly is classified into a jelly-roll type wound, where the electrodes are sheet-shaped and are coated with active materials with a separator interposed between the positive electrode and the negative electrode, and a stack type, in which a plurality of positive and negative electrodes of a predetermined size are sequentially stacked while a separator is interposed therebetween.

The positive and negative electrodes, respectively are formed by applying positive and negative electrode slurries, containing positive and negative electrode active materials, respectively to positive and negative electrode current collectors, respectively. The electrode slurries and current collectors are then dried and rolled.

At this time, the drying condition of the electrode influences the quality and physical properties of the electrode. Particularly, the adhesive force and the coupled level of the surface of the electrode can be significantly changed by controlling the deviation of the dryness, for the width direction of the electrode, and the time point when the drying is completed during the drying. Conventionally, an electrode is dried by determining the initial process condition in advance. The dried amount is then evaluated through measurement of physical properties of a sample, after the drying is complete. Finally, the process conditions are adjusted. However, such a method required a lot of time in measuring the physical properties, and it was difficult to reflect the dried amount evaluation result to the process in real time. As such, this method was not appropriate for a roll-to-roll consecutive production process.

Hence, there is a need for an electrode drying method capable of maintaining the dryness of the completed electrode constant by monitoring the dried amount of the electrode in real time and promptly reflecting the monitoring result to the process.

BRIEF SUMMARY

The present invention is believed to solve at least some of the above problems. For example, an aspect of the present invention provides a system and method of automatically controlling an electrode drying capable of reducing the deviation of a product by maintaining the dried level of a final electrode constant by automatically controlling the dried level of the electrode in real time.

A system for automatically controlling an electrode drying according to the present invention includes: an oven which provides a space where an electrode sheet is moved and dried, which includes a dryer that applies hot air and/or radiant heat to the electrode sheet, and is divided into a plurality of drying sections; a measuring unit which collects information on a dried amount of the electrode sheet and transmits the collected information to a controller; and the controller which determines a dried level of the electrode sheet based on the information on the dried amount received from the measuring unit, and control a drying intensity of the oven according to the determined dried level. Herein, the controller independently controls the plurality of drying sections.

In an embodiment of the present invention, the measuring unit is set to periodically collect information on the dried amount of the electrode sheet at regular time intervals, and the controller periodically controls the drying intensity of the oven by determining the dried level of the electrode sheet whenever receiving the information on the dried amount from the measuring unit.

In an embodiment of the present invention, the measuring unit collects information on the dried amount for 1 to 5 minutes right before a time point when the control of the drying intensity by the controller is expected.

In an embodiment of the present invention, the information on the dried amount includes information on at least one of a solid content and a surface temperature of the electrode sheet.

In an embodiment of the present invention, the controller includes: a data input unit which receives an input of the information on the dried amount collected by the measuring unit, and a reference setting value on the dried amount; a determination unit which determines the dried level of the electrode sheet by comparing the information on the dried amount with the setting value, and determines whether to adjust the drying intensity in the oven according the determined dried level; and a command unit which controls the drying intensity of the oven based on a result of determination of the determination unit.

In an embodiment of the present invention, the controller determines the dried level of the electrode sheet as one of 5 levels of a normal level, an overdried level, a non-dried level, an excessively overdried level, and an excessively non-dried level.

In an embodiment of the present invention, when the dried level of the electrode sheet is determined as the overdried level or the excessively overdried level, the controller controls to reduce the drying intensity of the oven, and when the dried level of the electrode sheet is determined as the non-dried level or the excessively non-dried level, the controller controls to increase the drying intensity of the oven.

In an embodiment of the present invention, when the dried level of the electrode sheet is determined as the overdried level or the non-dried level, the controller controls to adjust the drying intensity for one drying section, and when the dried level of the electrode sheet is determined as the excessively overdried level or the excessively non-dried level, the controller controls to adjust the drying intensity of two or more drying sections together.

In an embodiment of the present invention, the controller controls the drying intensity for drying sections other than a drying section at a front end of the oven among the plurality of drying sections.

In an embodiment of the present invention, the measuring unit transmits an average value or a median value of the collected information on the dried amount to the controller.

In an embodiment of the present invention, each of the plurality of drying sections includes a dryer, and the dryer includes at least one of a hot air nozzle, which applies convective heat by supplying hot air to the electrode sheet, and a heater, which applies radiant heat to the electrode sheet.

In an embodiment of the present invention, the controller controls at least one selected from the group consisting of a speed of hot air of the hot air nozzle, a volume of hot air of the hot air nozzle, a temperature of the heater, and a moving speed of a transfer roller which moves the electrode sheet.

In an embodiment of the present invention, the measuring unit includes at least one of a web gauge for measuring the loading amount of the electrode sheet and a temperature measuring instrument.

In an embodiment of the present invention, the measuring unit further includes a calculation unit, and the calculation unit calculates a solid content of the electrode from the loading amount measured by the web gauge.

A method of automatically controlling an electrode drying includes: (a) supplying an electrode sheet into an oven which is divided into a plurality of drying sections and has a dryer; (b) collecting information on a dried amount of the electrode sheet through a measuring unit; and (c) determining a dried level of the electrode sheet by comparing the collected information on the dried amount with a reference value, and controlling a drying intensity of the oven according to the determined dried level. Herein, the determining of the dried level includes independently controlling the plurality of drying sections.

In an embodiment of the present invention, during the step (b), the information on the dried amount includes information on at least one of a solid content and a surface temperature of the electrode sheet.

In an embodiment of the present invention, the step (b) includes periodically collecting information on the dried amount of the electrode sheet at regular time intervals, and the step (c) includes periodically controlling the drying intensity of the oven by determining the dried level of the electrode sheet whenever receiving the information on the dried amount through the step (b).

In an embodiment of the present invention, the step (c) includes determining the dried level of the electrode sheet as one of 5 levels of a normal level, an overdried level, a non-dried level, an excessively overdried level, and an excessively non-dried level.

In an embodiment of the present invention, during the step (c), when the dried level of the electrode sheet is determined as the overdried level or the non-dried level, the drying intensity is controlled to be adjusted for one drying section, and when the dried level of the electrode sheet is determined as the excessively overdried level or the excessively non-dried level, the drying intensity of two or more drying sections is controlled to be adjusted together.

According to the present invention, it is possible to automatically control the dried level of an electrode in real time by controlling the dried amount of the oven in real time by collecting the information on the dried amount of the electrode sheet and determining the dried level of the electrode from the collected information on the dried amount.

BRIEF DESCRIPTION OF THE DRAWINGS

FIG. 1 is a block diagram showing a configuration of an automatic electrode drying control system according to the present invention.

FIG. 2 is a schematic diagram illustrating a structure of an automatic electrode drying control system according to an embodiment of the present invention.

FIG. 3 is a block diagram illustrating a configuration of an automatic electrode drying control system according to an embodiment of the present invention.

FIG. 4 is a schematic diagram illustrating a structure of an automatic electrode drying control system according to another embodiment of the present invention.

FIG. 5 is a flowchart illustrating an order of an automatic electrode drying control method according to the present invention.

FIG. 6 is a photograph obtained by photographing an electrode sheet dried by an automatic control method according to an embodiment of the present invention using a thermal imaging camera.

DETAILED DESCRIPTION

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present invention will be described in detail with reference to the drawings.

FIG. 1 is a block diagram showing a configuration of an automatic electrode drying control system according to the present invention, and FIG. 2 is a schematic diagram illustrating a structure of an automatic electrode drying control system according to an embodiment of the present invention. Referring to these drawings, a system 100 for automatically controlling an electrode drying includes: an oven 110 which provides a space where an electrode sheet is moved and dried, includes a dryer which applies hot air and/or radiant heat to the electrode sheet, and is divided into a plurality of drying sections; a measuring unit 120 which collects information on a dried amount of the electrode sheet 10 and transmits the collected information to a controller 130; and the controller 130 which determines a dried level of the electrode sheet 10 based on the information on the dried amount received from the measuring unit 120, and control a drying intensity of the oven 110 according to the determined dried level. Herein, the controller 130 independently controls the plurality of drying sections.

As described above, the drying condition of the electrode significantly influences the quality and physical properties of the electrode. Conventionally, after drying an electrode by determining the initial process condition in advance, and the process condition was then adjusted through the evaluation of the dryness and physical properties of the product. However, in this case, it was difficult to control the drying of the electrode in real time.

According to the system for automatically controlling an electrode drying of the present invention, it is possible to automatically control the dried level of an electrode by appropriately adjusting the dried amount according to the dried level of the electrode sheet by determining the dried level by collecting information on the dried amount of the electrode sheet in real time and accordingly independently controlling a plurality of drying sections. Further, in the present invention, the x-axis means a direction in which an electrode is transferred, and the y-axis means a direction which is perpendicular to the transfer direction of the electrode on the electrode surface, as the width direction of the electrode. The z-axis corresponds to a direction in which hot air is sprayed or infrared rays are irradiated, as a direction perpendicular to the electrode surface.

Hereinafter, the configuration of the automatic electrode drying control system according to the present invention will be described in detail.

Referring to FIG. 2, an automatic electrode drying control system 100 according to the present invention includes an oven 110. The oven 110 has a chamber shape and provides a space where an electrode sheet 10 is dried, which is a space where the electrode sheet 10 to be dried may be moved inside the oven 110, and can prevent the internal heat from escaping.

Further, the electrode sheet 10 may have a structure in which an electrode active material layer 12 is formed as a slurry for electrode formation including an electrode active material is coated on the current collector sheet 11. The electrode slurry may be applied to at least one surface of the current collector.

In this case, the current collector may be a positive electrode current collector or a negative electrode current collector, and the electrode active material may be a positive electrode active material or a negative electrode active material. In addition, the electrode slurry may further include a conductive material and a binder in addition to the electrode active material.

In the present invention, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

The sheet for the negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}Md_O(2-\alpha)$ Ae such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d \leq 1$, M=Al, Mg, Cr, Ti, Si or Y, and A=F, P or Cl); olivine-based lithium metal phosphate represented by the formula $Li_{1+x}M_{1-y}M'_yPO_4-zX_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

Examples of the negative electrode active material include carbon such as non-graphitized carbon and graphite carbon; metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge;

Me': Al, B, P, Si, groups 1, 2, and 3 of the periodic table, halogen; 0<x≤1; 1≤y≤3; 1≤z≤8); lithium alloy; silicon alloy; tin alloy; metal oxides such as SnO, SnO2, PbO, PbO2, Pb2O3, Pb3O4, Sb2O3, Sb2O4, Sb2O5, GeO, GeO2, Bi2O3, Bi2O4, and Bi2O5; conductive polymers such as polyacetylene; and Li—Co—Ni-based materials.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

Meanwhile, such an electrode slurry may be prepared by dissolving an electrode active material, a conductive material, and a binder in a solvent. The type of the solvent is not particularly limited as long as it is capable of dispersing an electrode active material, and either an aqueous solvent or a non-aqueous solvent may be used. For example, the solvent may be a solvent generally used in the art, such as dimethyl sulfoxide (DMSO), isopropyl alcohol, N-methylpyrrolidone (NMP), acetone, or water, and one of them alone or a mixture of two or more may be used. The amount of the solvent used may be such that the slurry can be adjusted to have an appropriate viscosity in consideration of the coating thickness, production yield, and workability of the slurry, and is not particularly limited.

The oven 110 is divided into a plurality of drying sections 111, 112, and 113, and each of the drying sections includes a dryer for drying the electrode sheet 10 therein. The dryer includes a hot air nozzle 114, which applies convective heat by supplying hot air to the electrode sheet 10, and a heater 115, which applies radiant heat to the electrode sheet 10. Referring to FIG. 2, the hot air nozzles 114 and the heaters 115 may be arranged at regular intervals along the transfer direction (MD direction, x direction) of the electrode sheet 10, and hot air or radiant heat is applied in a direction perpendicular to the electrode sheet 10. In FIG. 2, it is illustrated that the hot air nozzle 114 and the infrared heater 115 are positioned on the upper portion of the electrode sheet 10, that is, the lower surface of the ceiling of the oven 110, but when the electrode active material layer is formed on both surfaces of the current collector, the hot air nozzle 114 and the heater 115 may be positioned on the upper portion and the lower portion of the electrode sheet 10, respectively. It is illustrated in FIG. 2 that both a hot air nozzle and a heater are included as the dryer, but the present invention is not limited to this example, and only one of the hot air nozzle and the heater may be included as the dryer.

On the other hand, the hot air nozzle 114 includes a main body unit and an injection unit. The main body unit constitutes the body of the hot air nozzle, and fixes the hot air nozzle 114 to the ceiling of the oven. In addition, the main body unit is empty inside and transmits hot air transmitted from a hot air supply source (not shown) to the injection unit. On the other hand, the injection unit is provided on the lower surface of the main body unit. The injection unit communicates with the main body unit, and an injection hole portion through which hot air is injected is formed on the lower surface of the injection unit. The injection hole portion may have a structure in which a plurality of pores are arranged at regular intervals.

Further, the heater 115 may be an infrared heater in a specific example of the present invention, and the infrared heater may include an infrared lamp which irradiates infrared rays to the electrode, and a cradle which supports the infrared lamp. The shape of the infrared lamp is not particularly limited, and for example, the rod-shaped lamp may be arranged in parallel along the transfer direction of the electrode while extending in the width direction of the electrode.

The hot air nozzles 114 and the heaters 115 may be alternately arranged in a direction in which the electrode sheet 10 is moved in order to evenly supply hot air and infrared rays to the surface of the electrode sheet 10. However, there is no particular limitation on the type of the arrangement, and the arrangement scheme of the hot air nozzles 114 and the infrared heaters 115 can be appropriately changed by one of ordinary skill in the art according to the drying condition.

Further, a transfer roller 116 for transferring an electrode may be included in the oven 110. A plurality of transfer rollers 116 may be arranged at regular intervals along the transfer direction of the electrode sheet 10, and the transfer rollers 116 support the electrode sheet 10 during the drying process and transfer the electrode sheet 10 to the outside of the oven 110. Further, the dried amount of the electrode sheet can also be controlled by adjusting the rotation speed of the transfer roller.

The oven 110 may be divided into a plurality of drying zones. When an overdried or non-dried situation occurs during the drying process of the electrode sheet 10, the electrode sheet 10 may need to be appropriately dried while changing the drying intensity. At this time, it is possible to independently control the drying intensity for each drying section by dividing the oven 110 into a plurality of drying sections. It is illustrated in FIG. 2 that the oven 110 is divided into 3 drying sections, but the oven may also be divided into 3 to 20 drying sections or 5 to 15 drying sections, and the present invention is not limited to this example. In the specification of the present invention, the 3 drying sections are referred to as a first drying section 111, a second drying section 112, and a third drying section 113.

The first drying section 111, the second drying section 112, and the third drying section 113 may be physically divided spaces by installing an inner wall between drying sections or may also be abstractly divided spaces according to the drying condition. The system 100 for automatically controlling an electrode drying according to the present invention includes a measuring unit which collects information on a dried amount of the electrode sheet and transmits the collected information to a controller.

In a specific example of the present invention, the information on the dried amount includes information on at least one of a solid content and a surface temperature of the electrode sheet. The system for automatically controlling an electrode drying of the present invention determines the dried level of the electrode sheet through information on the solid content and/or temperature, which is collected through the measuring unit. The measuring unit may include at least one of a web gauge for measuring the loading amount of the electrode sheet and a temperature measuring instrument in order to collect information on the solid content and the surface temperature of the electrode sheet.

Referring to FIG. 2, the measuring units 120*a* and 120*b* include a web gauge which measures the loading amount of the electrode sheet, and the measuring unit 120 may be installed at the entrance and the exit of the oven 110, respectively and measure the loading amount before drying the electrode sheet and the loading amount after drying the electrode sheet. The measuring unit may further include a calculation unit in order to derive the solid content, and the calculation unit may derive the solid content of the electrode active material layer 12 from the measured loading amount using a pre-entered calculation formula. A known formula in the related art can be used to derive the solid content from the loading amount.

When the dried level of the electrode sheet is excessive (overdrying), the solid content becomes greater than the reference value, and when the dried level of the electrode sheet is not sufficient, the solid content becomes smaller than the reference value. Hence, the solid content can become an indicator for recognizing the dried level of the electrode sheet.

The system 100 for automatically controlling an electrode drying according to the present invention includes a controller 130. The controller 130 may determine a dried level of the electrode sheet based on the information on the dried amount received from the measuring units 120*a* and 120*b*, and control a drying intensity of the oven 110 according to the determined dried level, to thereby adjust the dried amount of the electrode sheet in real time.

In order to adjust the dried amount of the electrode sheet in real time, the measuring unit is set to periodically collect information on the dried amount of the electrode sheet at regular time intervals, and the controller periodically controls the drying intensity of the oven by determining the dried level of the electrode sheet whenever receiving the information on the dried amount from the measuring unit.

FIG. 3 is a block diagram showing the configuration of a system for automatically controlling an electrode drying according to one embodiment of the present invention. Referring to FIG. 3, a controller 130 of the present invention includes: a data input unit 131 which receives an input of the information on the dried amount collected by the measuring unit, and a reference setting value on the dried amount; a determination unit 132 which determines the dried level of the electrode sheet by comparing the information on the dried amount with the setting value, and determines whether to adjust the drying intensity in the oven according the determined dried level; and a command unit 133 which controls the drying intensity of the oven based on a result of determination of the determination unit 132.

The data input unit 131 may receive information on the loading amount before/after drying the electrode sheet, and/or the dried amount, such as the temperature of the surface of the electrode from the measuring unit 120, and receives the input of the reference value for determining whether the dried level of the electrode sheet is excessive or insufficient. Further, the information on the dried amount and the reference value, which are inputted through the data input unit, are transmitted to the determination unit 132.

The determination unit 132 determines whether the dried level of the electrode sheet is the overdried level, the non-dried level or the normal level by comparing the information on the dried amount received from the data input unit 131 with the reference value, and the determination unit 132 determines the method of controlling the drying intensity by quantitatively recognizing the overdried or non-dried degree by comparing the information on the dried amount with the reference value.

The controller controls at least one of a speed of hot air of the hot air nozzle, a volume of hot air of the hot air nozzle, a temperature of the heater, and a moving speed of a transfer roller which moves the electrode sheet. In order for the controller to control the drying intensity of the oven, the command unit 133 transmits a driving operation command to the oven according to the change of the drying intensity determined by the determination unit.

The oven may adjust the drying intensity in the oven according to the driving operation command received from the command unit of the controller. The oven includes a hot air nozzle which applies convective heat by supplying hot air to the electrode sheet; and a heater which applies radiant heat to the electrode sheet, as a dryer. Herein, it is possible to adjust the dried amount of the electrode sheet by changing at least one of the temperature, speed and volume of hot air sprayed from the hot air nozzle according to driving operation command.

Further, it is possible to adjust the dried amount by controlling the rotation speed of the transfer roller which transfers the electrode sheet in addition to the driving operation of the hot air nozzle and/or heater.

The control of the drying intensity by the controller is periodically performed at regular time intervals. In one specific example, the controller may repeatedly control the drying intensity of the oven at the period of 5 to 20 minutes and preferably at the period of 6 to 15 minutes, but the present invention is not limited to these examples.

Further, the measuring unit is set to periodically collect the information on the dried amount of the electrode sheet at regular time intervals according to the drying intensity control by the controller. In one specific example, the measuring unit collects information on the dried amount for 1 to 5 minutes right before the time point when the control of the drying intensity by the controller is expected. Namely, the measuring unit does not promptly collect information on the dried amount of the electrode sheet after controlling the drying intensity of the oven, but it collects information on the dried amount of the electrode sheet after predetermined time passes from the performance of the control of the drying intensity by the controller. This is because it requires a predetermined time until the effect of dried amount adjustment according to the change of the drying intensity of the oven is shown.

The measuring unit set the average value or median value of the information on the dried amount collected during the predetermined time, as the representative value of the information on the dried amount, and transmit the value to the controller.

In the system for automatically controlling an electrode drying of the present invention, the controller controls the drying intensity for drying sections other than a drying section at a front end of the oven among the plurality of drying sections. The front end drying section means a drying section located at the entrance of the oven. In one specific example, in the case that an oven is sequentially divided into a first drying section to a N-th drying section from the entrance to the exit, the front end drying section may mean the first drying section to a (N/3)-th drying section, but the present invention is not limited to this example.

In such a front end drying section, since the electrode sheet has just been supplied into the oven, even if the drying intensity is adjusted in the front end drying section, the dried amount adjusting effect is insignificant, compared the effect in the following sections. Hence, the controller of the present invention controls the adjust the drying intensity in drying sections except for the front end drying section among a plurality of drying sections of the oven.

In one specific example, the controller may determine the dried level of the electrode sheet as one of 5 levels of a normal level, an overdried level, an non-dried level, an excessively overdried level, and an excessively non-dried level. The controller determines the dried level of the electrode sheet based on the predetermined reference value. If the information on the dried amount collected by the measuring unit is beyond the predetermined reference value but the difference is small, it is determined as the overdried level and the non-dried level, but if the difference is large, it is determined as the excessively overdried level or the excessively non-dried level.

The controller of the present invention also distinguishes the excessively overdried level and the excessively non-dried level by quantitatively recognizing the overdried and non-dried degree. Accordingly, the optimized drying intensity control can be performed according to the dried level.

Specifically, in the case that the dried level of the electrode sheet is normal, the drying intensity does not need to be changed. As such, the controller does not perform control of adjusting the drying intensity of the oven. Namely, a command to adjust the drying intensity is not transmitted to the oven.

When the dried level of the electrode sheet is determined as the overdried level or the excessively overdried level, the controller of the present invention controls to reduce the drying intensity of the oven, and when the dried level of the electrode sheet is determined as the non-dried level or the excessively non-dried level, the controller controls to increase the drying intensity of the oven.

Further, when the dried level of the electrode sheet is determined as the overdried level or the non-dried level, the controller of the present invention controls to adjust the drying intensity for one drying section, and when the dried level of the electrode sheet is determined as the excessively overdried level or the excessively non-dried level, the controller controls to adjust the drying intensity of two or more drying sections together.

In the case that the dried level of the electrode sheet is determined as the overdried level or non-dried level, the difference with the reference value is small. As such, if the drying intensity is uniformly adjusted for a plurality of drying sections, a reverse effect may be caused. For example, if the drying intensity for all drying sections is increased to adjust the non-dried state, the overdried level may be caused. Hence, the controller first controls to increase the drying intensity for only one drying section and receives a feedback on the information on the dried amount from the measuring unit and then performs follow-up control.

Further, when performing follow-up control, if the received information on the dried amount goes beyond the reference value and it is still determined as the non-dried level, the controller controls to increase the drying intensity in the following section of the drying section where the drying intensity has been previously controlled. Further, if the received information on the dried amount is within the range of the reference value, the adjustment of the drying intensity is not necessary. Hence, the control of adjusting the drying intensity is not performed.

Further, in the case that the dried level of the electrode sheet is determined as the overdried level, the controller of the present invention may sequentially reduce the drying intensity from the rear end drying section to the medium drying section. On the contrary, in the case that the dried level of the electrode sheet is determined as the non-dried level, the controller may sequentially increase the drying intensity from the middle drying section to the rear end drying section. The order of controlling the drying intensity is changed depending on whether the electrode sheet has been overdried or non-dried in order to enhance the dried amount adjusting efficiency.

Likewise, when the drying intensity is sequentially controlled according to the time sequential order, the drying intensity is not controlled for the front end drying section. Since the dried amount adjusting effect is small in the front end drying section, the control is sequentially performed from the middle drying section in order to enhance the dried amount adjusting efficiency.

Further, in the case that the dried level of the electrode sheet is the excessively overdried level or the excessively non-dried level, the difference with the reference value is relatively large. In this case, if the drying intensity is adjusted for only one drying section, the dried amount adjusting effect is insignificant. Hence, in this case, in order to relatively increase the change of the drying intensity, the controller of the present invention controls to adjust the drying intensity of two or more drying sections.

Specifically, when the dried level of the electrode sheet is determined as the excessively overdried level and the control of decreasing the drying intensity is performed, the control of simultaneously decreasing the drying intensity for the middle drying section and the rear end drying section is performed. On the other hand, when the dried level of the electrode sheet is determined as the excessively non-dried level and the control of increasing the drying intensity is performed, the control of simultaneously increasing the drying intensity for the middle drying section and the rear end drying section is performed.

FIG. 4 is a schematic diagram illustrating a structure of an automatic electrode drying control system according to another embodiment of the present invention. Referring to FIG. 4, web gauges 221a and 221b for measuring the loading amount of the electrode sheet are installed at the entrance and the exit of the oven, respectively, and a temperature measuring instrument 222 is installed between the first drying section 211 and the second drying section 212, between the second drying section 212 and the third drying section 213, and at the exit of the oven. The temperature measuring instrument may measure the temperature of the surface of the electrode. Further, it is illustrated in FIG. 4 that the temperature measuring instrument 222 is positioned on the upper portion of the electrode sheet 10, but when the electrode active material layer is formed on both surfaces of the current collector, the temperature measuring instrument 222 may be positioned on both the upper portion and the lower portion of the electrode.

In one example, the temperature measuring instrument 222 may be positioned inside the oven 110 and measure the temperature of the surface of the electrode sheet 10. There is no limitation to the type of the temperature measuring instrument as long as it can measure the temperature of the surface of the electrode. Specifically, it may be a temperature sensor or a thermal imaging camera.

In the case that the temperature measuring instrument 222 is a thermal imaging camera, it may be arranged in a manner that penetrates the outer wall of the oven, and in order to prevent the thermal imaging camera from being exposed to an excessively high temperature, it is preferably positioned at a relatively low temperature place. Further, the thermal imaging camera is preferably positioned at a place where a user's view is not blocked by the hot air nozzle 214 and the heater 215 in the oven 210. Hence, the thermal imaging camera may be positioned at a position where the hot air nozzle 213 and the infrared heater 215 have not been arranged.

Further, in order to prevent a damage to the temperature measuring instrument installed inside the oven, a cooling device (not shown) for cooling the temperature measuring instrument may be further included. The cooling device allows the continuous measurement of the temperature of the surface of the electrode by preventing a damage to the temperature measuring instrument by a high temperature environment in the oven.

The cooling device may be fastened or attached to the temperature measuring instrument from the external side of the oven in order to prevent a change in the temperature inside the oven. There is no limitation to the shape of the cooling device as long as it can cool the temperature measuring instrument. For example, it may be a cooling jacket which covers the temperature measuring instrument and contains refrigerants therein.

Further the present invention provides a method of automatically controlling an electrode drying.

FIG. 5 is a flowchart illustrating an order of an automatic electrode drying control method according to the present invention.

Referring to FIG. 5, a method of automatically controlling an electrode drying includes: (a) supplying an electrode sheet into an oven which is divided into a plurality of drying sections and has a dryer; (b) collecting information on a dried amount of the electrode sheet through a measuring unit; and (c) determining a dried level of the electrode sheet by comparing the collected information on the dried amount with a reference value, and controlling a drying intensity of the oven according to the determined dried level. Herein, the determining of the dried level includes independently controlling the plurality of drying sections.

According to the method of automatically controlling an electrode drying of the present invention, the collecting of the information includes periodically collecting information on the dried amount of the electrode sheet at regular time intervals, and the determining of the dried level includes periodically controlling the drying intensity of the oven by determining the dried level of the electrode sheet whenever receiving the information on the dried amount during the collecting of the information. Therefore, according to the method of automatically controlling an electrode drying of the present invention, it is possible to automatically control the dried amount to be uniform by adjusting the dried amount to fit the predetermined reference value after receiving information on the dried amount of the electrode sheet in real time.

Hereinafter, each step of the automatic electrode drying control system according to the present invention will be described in detail.

<Preparation of Electrode>

First, an electrode sheet is manufactured by coating a slurry for electrode formation including an active material on the current collector sheet. Details of the electrode sheet are the same as described above. If the electrode sheet is manufactured, a drying is started by supplying the electrode sheet into the above-described oven.

<Drying of Electrode Sheet and Collecting of Information on Dried Amount>

When an electrode sheet is supplied into an oven, the electrode sheet is dried as a solvent in the slurry is removed by a dryer such as a heater or a hot air nozzle while the electrode sheet is moved inside the oven. Further, the measuring unit collects information on the dried amount of the electrode sheet. The information on the dried amount includes information on at least one of a solid content and a surface temperature of the electrode sheet. The process of collecting information on the dried amount by the measuring unit is performed by measuring the surface temperature of the electrode sheet through a temperature measuring instrument installed inside or outside the oven or by an electrode loading amount measuring means such as a web gauge which is installed at the entrance and the exit of the oven.

In one specific example, the measuring unit may further include a calculation unit which calculates the solid content from the loading amount of the electrode sheet before and after the drying.

<Determination of Dried Level and Control of Drying Intensity>

If information on the dried amount such as the surface temperature of the electrode sheet or the solid content is obtained from the measuring unit, it is compared with the reference value to thereby perform the operation of determining the dried level of the electrode sheet. If the measure dried amount is smaller than the reference value, it means that the drying is insufficient. Hence, in order to increase the drying intensity, it is possible to increase at least one of the temperature, speed and volume of the hot air of the hot air nozzle, and the temperature of the heater in the oven. On the contrary, if the measure dried amount is greater than the reference value, it means that it has been overdried. Hence, in order to decrease the drying intensity, it is possible to decrease at least one of the temperature, speed and volume of the hot air of the hot air nozzle, and the temperature of the heater in the oven.

Further, the oven may be divided into a plurality of drying sections as described above, and they drying sections may be divided into a front end drying section, a middle drying section, and a rear end drying section. The method of automatically controlling an electrode drying of the present invention does not perform control of the drying intensity in the front end drying section. The front end drying section is an initial drying section where the electrode sheet is dried right after the termination of the coating process. It is not desirable to periodically change the drying intensity at the initial drying section where the electrode sheet is stabilized, and the dried amount adjustment in the middle drying section and the rear end drying section is sufficient in terms of the dried amount adjusting efficiency.

Hence, even when the control of the drying intensity is necessary, the drying intensity is controlled by changing the driving condition of the hot air nozzle or the heater installed in the middle drying section and the rear end drying section without changing the driving condition of the hot air nozzle or the heater included in the front end drying section.

Further, the method of automatically controlling an electrode drying of the present invention may be changed according to the quantitative change between the dried level of the electrode sheet determined according to the above method and the target dried level. Specifically, the determining of the dried level includes determining the dried level of the electrode sheet as one of 5 levels of a normal level, an overdried level, a non-dried level, an excessively overdried level, and an excessively non-dried level.

According to the control method of the present invention, when the information on the dried amount of the electrode sheet collected by the measuring unit is compared with the target reference value, if the information on the dried amount of the electrode sheet fits the reference value, it is determined as the normal level. When the information on the dried amount of the electrode sheet collected by the measuring unit is compared with the target reference value, if the difference is within the predetermined range, it is determined as the overdried level or the non-dried level. If the difference is beyond the predetermined range, the dried level of the electrode sheet is determined as the excessively overdried level or the excessively non-dried level.

For example, on an assumption that the dried level of the electrode sheet is determined through the solid content, and the reference value of the predetermined solid content is 88 to 89%, if the information on the dried amount of the electrode sheet collected by the measuring unit is within ±1%, compared with the reference value, it is determined as the overdried level or the non-dried level, if the information on the dried amount of the electrode sheet collected by the measuring unit is beyond ±1%, compared with the reference value, it is determined as the excessively overdried level or the excessively non-dried level, and if the information on the dried amount of the electrode sheet collected by the measuring unit is within the reference value range, it is determined as the normal level.

In the method of automatically controlling an electrode drying of the present invention, when the dried level of the electrode sheet is determined as the overdried level or the non-dried level, the controller controls to adjust the drying intensity for one drying section, and when the dried level of the electrode sheet is determined as the excessively overdried level or the excessively non-dried level, the controller controls to adjust the drying intensity of two or more drying sections together. Further, in the case that it is determined that the dried level of the electrode sheet is normal, control of adjusting the drying intensity of the oven is not performed because the drying intensity of the oven is appropriate.

In the case that the dried level of the electrode sheet is the overdried level or the non-dried level, the drying intensity may first be increased for one drying section, and after some time passes until the dried amount adjusting effect according to the adjustment of the drying intensity is shown, the dried level is determined again by receiving information on the dried amount from the measuring unit, and follow-up drying intensity control is performed according the received information, thereby more accurately adjusting the dried amount.

Further, the method of adjusting the drying intensity for one drying section after determining whether the dried level of the electrode sheet is the overdried level or the non-dried level may be different, depending on whether it is the overdried level or the non-dried level. Specifically, when the dried level of the electrode sheet is determined as the overdried level, the control of decreasing the drying intensity should be performed. At this time, the control of sequentially decreasing the drying intensity from a drying section close to the exit of the oven is performed. In the case that, in an oven, which is divided into a plurality of drying sections, the drying sections of the entrance to the exit are numbered as are referred to as a first drying section to a N-th drying section, if the dried level of the electrode sheet is determined as the overdried level, the control of decreasing the drying intensity is performed in the N-th drying section closest to the exit of the oven. Further, predetermined time passes, and in the case that the measuring unit collects information on the dried amount of the electrode sheet and compares the information with the reference value, if the dried level of the electrode sheet is still determined as the overdried level, the control of decreasing the drying intensity in the (N−1)-th drying section is performed.

On the contrary, if the dried level of the electrode sheet is determined as the non-dried level, the control of increasing the drying intensity should be performed. At this time, the control of sequentially increasing the drying intensity from drying sections close to the entrance of the oven is performed. In the present invention, the control of adjusting the drying intensity is not performed in the initial drying section close to the entrance of the oven, and accordingly, if the initial drying section corresponds to the first drying section to the 8th drying section, the control of increasing the drying intensity is performed in the 9th drying section. Further, predetermined time passes, and in the case that the measuring unit collects information on the dried amount of the electrode sheet and compares the information with the reference value, if the dried level of the electrode sheet is still determined as the non-dried level, the control of increasing the drying intensity in the 10th drying section is performed.

Further, in the case that the dried level of the electrode sheet is determined as the overdried level or the excessively overdried level, the effect of adjusting the dried amount may not be sufficient by changing the drying intensity in only one drying section. As such, an appropriate control of the drying intensity may be performed by simultaneously adjusting the drying intensity of two or more drying sections.

After performing the control of adjusting the drying intensity of the oven as described above, the process of drying the electrode sheet with the adjusted drying intensity is performed for predetermined time. As such, the dried amount of the electrode sheet may be adjusted to some extent by the adjusted drying intensity. Further, in order to recognize the dried level of the electrode sheet again, the process of collecting information on the dried amount is performed in the same manner as described above.

At this time, information on the dried amount may be collected for 1 to 5 minutes right before a time point when the following control of the drying intensity is expected. Namely, the information on the dried amount of the electrode sheet may be collected for 2 minutes right before a time point when the following control of the drying intensity is expected, for 3 minutes right before a time point when the following control of the drying intensity is expected, or for 4 minutes right before a time point when the following control of the drying intensity is expected. Further, an average value or a median value of information on the dried amount collected for predetermined time may be recognized as information on the dried amount.

Likewise, the process of determining the dried level of the electrode sheet in the same manner as described based on the recognized information on the dried amount, and controlling the drying intensity of the oven is performed, and the dried level of the electrode sheet can be controlled to be uniform by periodically performing the dried amount collection process, the dried level determination and drying intensity control process.

Hereinafter, an automatic control system of the present invention will be described in more detail through an embodiment of the present invention. The following table 1 shows the reference value for determining the dried level of the electrode sheet, and the determination result and control method according thereto.

TABLE 1

| Reference value | Solid content of electrode sheet collected in measuring unit | Dried level | Drying intensity control method |
|---|---|---|---|
| Reference value: 88 to 89% solid content | less than 87% | Excessively non-dried level | Increase drying intensity in drying section except for front end drying section (Two plus control) |
| | Equal to or greater than 87% and less than 88% | Non-dried level | Increase drying intensity from drying section after front end drying section (One plus control) |
| | 88%~89% | Normal level | Drying intensity control is not performed |
| | Greater than 89% and equal to or less than 90% | Overdried level | Decrease drying intensity from rear end drying section among drying sections except for front end drying section (One minus control) |
| | Greater than 90% | Excessively overdried level | Decrease drying intensity in drying section except for front end drying section (Two minus control) |

Referring to Table 1, the reference value of the solid content is 88 to 89%. In the case that the measured solid content is less than the setting value, the drying intensity is raised because it means that the drying is insufficient, and on the other hand, in the case that the measured solid content is greater than the setting value, the drying intensity is reduced because it means that the drying is excessive.

A plurality of drying sections, which are sequentially arranged from the entrance to the exit of the oven, are divided into a first drying section, a second drying section, . . . , a (N−1)-th drying section, and a N-th drying section, and the method of controlling the drying intensity will be described in detail.

First, if the measured solid content is in the range of 88 to 89%, it means that the dried level is normal, and accordingly, the existing drying intensity may be maintained. Hence, control of adjusting the drying intensity does not need to be performed.

If the measured solid content is less than 87%, it is determined as the excessively non-dried level, and accordingly, the control of increasing the drying intensity is performed for the drying sections except for the front end drying section. If the front end drying section corresponds to the first drying section to the (N/3)-th drying section, the drying intensity is increased from the following drying section to the N-th drying section. This is referred to as two plus control for the convenience of explanation.

If the measured solid content is greater than 90%, it is determined as the excessively overdried level, and accordingly, the control of decreasing the drying intensity is performed for the drying sections except for the front end drying section. This is referred to as two minus control for the convenience of explanation.

If the measured solid content is between 87% and 88%, it is determined as the non-dried level, and accordingly, the drying intensity is increased at the following drying section of the front end drying section. This is referred to as one plus control for the convenience of explanation. One plus control does not increase the drying intensity for the drying section, where the drying intensity has already been increased, and increases the drying intensity for the following drying section. For example, control of increasing the drying intensity of the 5th drying section to some extent is performed by performing one plus control in the 5th drying section, and after some time passes, if the solid content collected from the measuring unit is 87.5%, it is still in the non-dried level, and accordingly one plus control should be performed. At this time, control of increasing the drying intensity of the 6th drying section followed by the 5th drying section is performed, and control of changing the drying intensity of the 5th drying section is not performed.

Since the measured solid content is greater than 89% and is equal to or less than 90%, it is determined as the overdried level, and accordingly, control of decreasing the drying intensity from the rear end drying section close to the exit of the oven among drying sections except for the front end drying section is performed. This is referred to as one minus control for the convenience of explanation. One minus control does not decrease the drying intensity for the drying section, where the drying intensity has already been deceased, and decreases the drying intensity for the previous drying section. For example, control of decreasing the drying intensity of the 15th drying section to some extent is performed by performing one minus control in the 15th drying section, and after some time passes, if the solid content collected from the measuring unit is 89.8%, it is still in the overdried level, and accordingly one minus control should be performed. At this time, control of decreasing the drying intensity of the 14th drying section before the 15th drying section is performed, and control of changing the drying intensity of the 15th drying section is not performed.

Hereinafter, the control system and the control method of the present invention will be described in more detail with reference to Table 2 below.

TABLE 2

| Seq. No. | Time | Solid content | 10th drying section | 11th drying section | 12th drying section | Control method |
|---|---|---|---|---|---|---|
| 1 | 09:25 | 87.9 | 1 | 1 | 1 | — |
| 2 | 09:35 | 87.6 | 2 | 1 | 1 | One plus control |
| 3 | 09:45 | NA | — | — | — | no control because it is non-coated |
| 4 | 09:55 | 91.8 | 1 | 0 | 0 | Two minus control |
| 5 | 10:05 | 88.2 | 1 | 0 | 0 | Target |
| 6 | 10:15 | 87.7 | 1 | 1 | 0 | One plus control |
| 7 | 10:25 | 87.4 | 1 | 1 | 1 | One plus control |
| 8 | 10:35 | 87.2 | 2 | 1 | 1 | One plus control |
| 9 | 10:45 | 87.5 | 2 | 2 | 1 | One plus control |
| 10 | 10:55 | 87.3 | 2 | 2 | 2 | One plus control |
| 11 | 11:05 | 87.3 | 2 | 2 | 2 | Upper limit |
| 12 | 11:15 | 94.6 | 1 | 1 | 1 | Two minus control |
| 13 | 11:25 | 88.4 | 1 | 1 | 1 | Target |
| 14 | 11:35 | 87.8 | 2 | 1 | 1 | One plus control |
| 15 | 11:45 | 87.6 | 2 | 2 | 1 | One plus control |

Referring to the above Table 2, solid contents are measured at intervals of 10 minutes from sequence number 1 to sequence number 15, and accordingly, control of adjusting the drying intensity was performed (herein, solid content was not measured in sequence number 3 because sequence number 3 corresponds to a non-coated part). Further, the control method according to the solid content measured for each sequence number was disclosed at the last row of Table 2. Further, numbers 0, 1 and 2 written in the rows of 10th to 12th drying sections are arbitrary values which indicate the change of the drying intensity.

The automatic control system and automatic control method of the present invention will be described in detail with reference to the above Table 2.

Since the solid content is 87.6% in the sequence number 2, the dried level of the electrode sheet is determined as the non-dried level, and one plus control is performed. As such, the drying intensity of the 10th drying section becomes 2, which is increased by 1 from the drying intensity 1 at the sequence number 1, by increasing the drying intensity for only the 10th drying section, and the control of increasing the drying intensity is not performed in other drying sections, thereby maintaining the drying intensity 1 of the sequence number 1.

Since sequence number 3 corresponds to the non-coated part, the control is not performed.

Since the solid content is 91.8% in the sequence number 4, the dried level of the electrode sheet is determined as the excessively overdried level, and two minus control is performed. As such, the control of decreasing the drying intensity by 1 is performed for each of the 10-th drying section to 12th drying section. As such, the drying intensity becomes 1, 0 and 0 which are decreased by 1 from drying intensity 2, 1 and 1 of each zone at sequence number 2.

Since the solid content is 88.2% in the sequence number 5, the dried level of the electrode sheet is determined as the normal level, and the control of adjusting the drying intensity is not performed. As such, the drying intensity of the 10th drying section to 12th drying section is the same as each of the drying sections at the sequence number 4.

Since the solid content is 87.7% in the sequence number 6, the dried level of the electrode sheet is determined as the non-dried level, and one plus control is performed. As such, the drying intensity is increased in the 11th drying section which is a drying section followed by the 10th drying section in which the drying intensity has been increased in the sequence number 2. As such, the drying intensity at the 10th drying section is maintained as the drying intensity 1 at the sequence number 5, and the drying intensity of the 11-th drying section becomes 1 which has been increased by 1 from the drying intensity 0 of the 11th drying section in the sequence number 5.

Since the solid content is 87.4% in the sequence number 7, the dried level of the electrode sheet is determined as the non-dried level, and one plus control is performed. As such, the drying intensity is increased by 1 only in the 12th drying section which is a drying section followed by the 11th drying section in which the drying intensity has been increased in the sequence number 6. Hence, the drying intensity of each of the 10th drying section to the 12th drying section becomes 1, 1 and 1 from the drying intensity 1, 1 and 0 in the sequence number 6.

Since the solid content is 87.2% in the sequence number 8, the dried level of the electrode sheet is determined as the non-dried level, and one plus control is performed. Since the drying intensity has been sequentially increased in the 10th drying section to the 12th drying section, the drying intensity is increased again by 1 in only the 10th drying section. As such, the drying intensity of each of the 10th drying section to the 12th drying section becomes 2, 1 and 1 from the drying intensity 1, 1 and 1 in the sequence number 7.

In the sequence numbers 9 and 10, one plus control is performed. The specific method is the same as described above.

Since the solid content is 87.3% in the sequence number 11, the dried level of the electrode sheet is determined as the non-dried level, and one plus control should be performed. However, since the drying intensity of the 10th to 12th drying sections was increased to the upper limit (2), control is not performed in order not to increase the drying intensity any more.

Since the control method in the sequence numbers 12 to 15 is the same as part of what was described above, the detailed description thereof is omitted.

FIG. 6 illustrates a photograph obtained by photographing the electrode sheet, which has been dried according to the control of sequence numbers 2 to 15, using a thermal imaging camera. Referring to FIG. 6, the electrode sheet, which has been dried according to the automatic drying control system according to the example of the present invention, shows the uniform temperature along the longitudinal direction. Hence, the automatic drying control system of the present invention shows an effect of manufacturing an electrode sheet having a uniform dried level.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

The invention claimed is:

1. A system for automatically controlling an electrode drying, the system comprising:
   an oven which provides a space where an electrode sheet is moved and dried, includes a dryer which applies hot air and/or radiant heat to the electrode sheet, and is divided into a plurality of drying sections;
   a measuring unit which collects information on a dried amount of the electrode sheet and transmits the information on the dried amount to a controller; and
   the controller which determines a dried level of the electrode sheet based on the information on the dried amount received from the measuring unit, and control a drying intensity of the oven according to a determined dried level,
   wherein the controller independently controls the plurality of drying sections.

2. The system of claim 1, wherein the measuring unit is set to periodically collect information on the dried amount of the electrode sheet at regular time intervals, and
   wherein the controller periodically controls the drying intensity of the oven by determining the dried level of the electrode sheet whenever receiving the information on the dried amount from the measuring unit.

3. The system of claim 2, wherein the measuring unit collects information on the dried amount for 1 to 5 minutes right before a time point when the control of the drying intensity by the controller is expected.

4. The system of claim 1, wherein the information on the dried amount includes information on at least one of a solid content and a surface temperature of the electrode sheet.

5. The system of claim 1, wherein the controller includes:
   a data input unit which receives an input of the information on the dried amount collected by the measuring unit, and a reference setting value on the dried amount;
   a determination unit which determines the dried level of the electrode sheet by comparing the information on the dried amount with the setting value, and determines whether to adjust the drying intensity in the oven according to the determined dried level; and a command unit which controls the drying intensity of the oven based on a result of determination of the determination unit.

6. The system of claim 1, wherein the controller determines the dried level of the electrode sheet as one of 5 levels of a normal level, an overdried level, a non-dried level, an excessively overdried level, or an excessively non-dried level.

7. The system of claim 6, wherein when the dried level of the electrode sheet is determined as the overdried level or the excessively overdried level, the controller controls to reduce the drying intensity of the oven, and wherein when the dried level of the electrode sheet is determined as the non-dried level or the excessively non-dried level, the controller controls to increase the drying intensity of the oven.

8. The system of claim 6, wherein when the dried level of the electrode sheet is determined as the overdried level or the non-dried level, the controller controls to adjust the drying intensity for one drying section, and wherein when the dried level of the electrode sheet is determined as the excessively overdried level or the excessively non-dried level, the controller controls to adjust the drying intensity of two or more drying sections together.

9. The system of claim 1, wherein the controller controls the drying intensity for drying sections other than a drying section at a front end of the oven among the plurality of drying sections.

10. The system of claim 1, wherein the measuring unit transmits an average value or a median value of the information on the dried amount to the controller.

11. The system of claim 1, wherein each of the plurality of drying sections includes a dryer, and wherein the dryer includes at least one of a hot air nozzle, which applies convective heat by supplying hot air to the electrode sheet, or a heater, which applies radiant heat to the electrode sheet.

12. The system of claim 11, wherein the controller controls at least one selected from a group consisting of a speed of hot air of the hot air nozzle, a volume of hot air of the hot air nozzle, a temperature of the heater, and a moving speed of a transfer roller which moves the electrode sheet.

13. The system of claim 1, wherein the measuring unit includes at least one of a web gauge for measuring a loading amount of the electrode sheet and a temperature measuring instrument.

14. The system of claim 13, wherein the measuring unit further includes a calculation unit, and wherein the calculation unit calculates a solid content of the electrode sheet from a loading amount measured by the web gauge.

15. A method of automatically controlling an electrode drying, the method comprising:

(a) supplying an electrode sheet into an oven which is divided into a plurality of drying sections and has a dryer;

(b) collecting information on a dried amount of the electrode sheet through a measuring unit; and (c) determining a dried level of the electrode sheet by comparing the information on the dried amount with a reference value, and controlling a drying intensity of the oven according to the determined dried level, wherein the determining of the dried level includes independently controlling the plurality of drying sections.

16. The method of claim 15, wherein during the collecting of the information, the information on the dried amount includes information on at least one of a solid content and a surface temperature of the electrode sheet.

17. The method of claim 15, wherein the collecting of the information includes periodically collecting information on the dried amount of the electrode sheet at regular time intervals, and wherein the determining of the dried level includes periodically controlling the drying intensity of the oven by determining the dried level of the electrode sheet whenever receiving the information on the dried amount during the collecting of the information.

18. The method of claim 15, wherein the determining of the dried level includes determining the dried level of the electrode sheet as one of 5 levels of a normal level, an overdried level, a non-dried level, an excessively overdried level, and an excessively non-dried level.

19. The method of claim 18, wherein during the determining of the dried level, when the dried level of the electrode sheet is determined as the overdried level or the non-dried level, the drying intensity is controlled to be adjusted for one drying section, and wherein when the dried level of the electrode sheet is determined as the excessively overdried level or the excessively non-dried level, the drying intensity of two or more drying sections is controlled to be adjusted together.

* * * * *